(12) United States Patent
Hegi et al.

(10) Patent No.: US 7,419,715 B2
(45) Date of Patent: Sep. 2, 2008

(54) LIGHT DIFFUSING FILMS

(75) Inventors: Yasuhiro Hegi, Kyoto (JP); Masashi Doi, Kyoto (JP); Kyoji Kitamura, Kyoto (JP); Shinya Okada, Kyoto (JP)

(73) Assignee: OMRON Corporation, Kyoto (JP)

( * ) Notice: Subject to any disclaimer, the term of this patent is extended or adjusted under 35 U.S.C. 154(b) by 62 days.

(21) Appl. No.: 10/333,387

(22) PCT Filed: Jul. 16, 2001

(86) PCT No.: PCT/JP01/06124

§ 371 (c)(1),
(2), (4) Date: Jun. 30, 2004

(87) PCT Pub. No.: WO02/06859

PCT Pub. Date: Jan. 24, 2002

(65) Prior Publication Data

US 2004/0030081 A1 Feb. 12, 2004

(30) Foreign Application Priority Data

Jul. 18, 2000 (JP) .............................. 2000-217556

(51) Int. Cl.
*C08F 2/46* (2006.01)
*D06N 7/04* (2006.01)
(52) U.S. Cl. ........................... 428/147; 522/79; 522/96; 522/103; 522/108; 522/182; 526/323.1
(58) Field of Classification Search ................. 428/147, 428/141, 143; 430/332, 285.1, 338; 522/100, 522/103, 79, 96, 108, 182; 526/318.44, 320, 526/323.1
See application file for complete search history.

(56) References Cited

U.S. PATENT DOCUMENTS

| 4,134,811 | A | | 1/1979 | De Poortere et al. | |
| 5,275,663 | A | | 1/1994 | Kim et al. | |
| 6,111,699 | A | * | 8/2000 | Iwata et al. | 359/599 |
| 6,217,176 | B1 | * | 4/2001 | Maekawa | 359/601 |
| 6,361,925 | B1 | * | 3/2002 | Leppard et al. | 430/281.1 |
| 6,447,877 | B1 | * | 9/2002 | Hegi et al. | 428/147 |
| 6,696,140 | B2 | * | 2/2004 | Suzuki | 428/212 |

FOREIGN PATENT DOCUMENTS

| EP | 0900808 | * | 10/1999 |
| JP | 39-10515 | | 6/1964 |
| JP | 50-146646 | | 11/1975 |
| JP | 56-33677 | | 4/1981 |
| JP | 60-175303 | | 9/1985 |
| JP | 61-004762 | | 1/1986 |
| JP | 63-291002 | | 11/1988 |
| JP | 01-172801 | | 7/1989 |
| JP | 02-173707 | | 7/1990 |
| JP | 03-78701 | | 4/1991 |
| JP | 5-307105 A | | 11/1993 |
| JP | 06-138308 | | 5/1994 |
| JP | 07-209502 | | 8/1995 |
| JP | 07-218705 | | 8/1995 |
| JP | 09-113708 | | 5/1997 |
| JP | 11-60966 A | | 3/1999 |
| JP | 11-145667 | * | 5/1999 |
| JP | 11-160505 | | 6/1999 |
| JP | 11-199798 | * | 7/1999 |

OTHER PUBLICATIONS

Patent Abstracts of Japan, Publication No. 61-004762, Publication Date Jan. 10, 1986, 2 pages.
Patent Abstracts of Japan, Publication No. 63-291002 A, Publication Date Nov. 28, 1988, 1 page.
Patent Abstracts of Japan, Publication No. 01-172801 A, Publication Date Jul. 7, 1989, 1 page.
Patent Abstracts of Japan, Publication No. 02173701 A, Publication Date Jul. 5, 1990, 1 page.
Patent Abstracts of Japan, Publication No. 03078701 A, Publication Date Apr. 3, 1991, 1 page.
Patent Abstracts of Japan, Publication No. 06138308 A, Publication Date May 20, 1994, 1 page.
Patent Abstracts of Japan, Publication No. 07209502 A, Publication Date Aug. 11, 1995, 1 page.
Patent Abstracts of Japan, Publication No. 07218705 A, Publication date Aug. 18, 1995, 1 page.
Patent Abstracts of Japan, Publication No. 09113708 A, Publication Date May 2, 1997, 1 page.
Patent Abstracts of Japan, Publication No. 11160505 A, Publication Date Jun. 18,1999, 1 page.
Patent Abstracts of Japan, publication No. 11-199798, Publication Date Jul. 27, 1999, 1 page.
Patent Abstracts of Japan, Publication No. 11-060966, Publication Date Mar. 5, 1999, 2 pages.
Patent Abstracts of Japan, Publication No. 05-307105, Publication Date Nov. 19,1993, 2 pages.
Japanese Office Action in JP2002-512713 dated May 2, 2006 (4 pages—computer translation—6 pages).

* cited by examiner

*Primary Examiner*—Helen L. Pezzuto
(74) *Attorney, Agent, or Firm*—Osha • Liang LLP

(57) ABSTRACT

A light diffusing resin film is formed by curing a light-curable liquid resin composition whose indispensable components are a photo-polymerizable monomer (A), an organic compound (B) that is incompatible with the photo-polymerizable monomer (A), a cosolvent (C) that is compatible commonly with the photo-polymerizable monomer (A) and the organic compound (B) that is incompatible with the photo-polymerizable monomer (A), and a photo-polymerization initiator (D), a light diffusing film having the resin film on a film substrate, an edge lighting type backlight unit in which the light diffusing film is used, and a liquid crystal display device provided with the edge lighting type backlight unit.

25 Claims, 4 Drawing Sheets

CONCAVOCONVEX SHAPE

LIGHT DIFFUSING FILMS

TECHNICAL FIELD

The present invention relates to a light diffusing film, and further relates to a light diffusing film that does not contain a light diffusing agent because a light diffusing layer is formed due to an UV irradiation.

BACKGROUND ART

In a liquid crystal display device for a word processor, a personal computer, a TV, a liquid crystal display instrument or the like, in order to increase visibility, in a backlight unit, a light diffusing film or sheet (generally called a light diffusing plate; in the present specification, hereinafter this will be typically referred to as a light diffusing film) is used. The most primary optical characteristics required for the light diffusing film are total light transmittance of at least 90% for visible light and a haze of at least 85% thereto. The light diffusibility of the light diffusing film can be given, for instance, by giving concavities and convexities on a film surface, or by mixing and dispersing several tens % by weight of a light diffusing agent such as fine particles inside of the film or in a resin (binder) coated on a film surface.

As one in which the light diffusibility can be given by forming the concavities and the convexities on the film surface, light diffusing films in which the concavities and the convexities are formed on a surface of a transparent resin film made of polyethylene terephthalate resin, polymethylmethacrylate resin, or polycarbonate resin can be used. However, only by giving the concavities and the convexities on the film surface by embossing or sand blasting, it is difficult to obtain excellent light transparency and light diffusibility in combination.

As one in which the light diffusing agent such as fine particles is dispersed inside of a film, a light diffusing film in which in a transparent film made of polymethylmethacrylate resin, polycarbonate resin or the like, a light diffusing agent such as calcium carbonate, titanium oxide, glass beads, silica particles, polystyrene particles, silicone resin particles, cross-linked polymer particles or the like is dispersed can be used. These are disclosed in, for instance, JP-A-50-146646, JP-A-56-33677, JP-A-60-175303, JP-A-61-4762, JP-A-63-291002, JP-A-1-172801, JP-A-2-173701, JP-A-3-78701 and so on.

As one in which a light diffusing agent is dispersed in a solution in which a plastic or curable resin is dissolved in a solvent and coated on a film surface, a light diffusing film in which fine particles such as calcium carbonate, silica particles, acrylic polymer particles, silicone resin particles, polystyrene particles, urea resin particles, polyethylene particles, polycarbonate particles, polyvinyl chloride particles, cured melamine resin particles or the like can be used. These are disclosed in JP-A-1-172801, JP-A-6-138308, JP-A-7-209502, JP-A-7-218705, JP-A-9-113708, JP-A-11-160505 and so on.

In JP-A-160505, a method in which a liquid resin composition in which plastic particles are dispersed as the light diffusing agent in a UV-curable resin is coated on a transparent film followed by curing by irradiating with a UV light, and thereby a coating type light diffusing film is produced is also proposed.

DISCLOSURE OF THE INVENTION

Technical Problems that the Invention is to Solve

The above existing coating type light diffusing films have the following problems.

(1). There is a large difference of density between the density of inorganic particles such as calcium carbonate particles and silica particles and that of a resin (binder) solution, accordingly the inorganic particles tend to precipitate, resulting in causing difficulty in obtaining a homogeneous dispersion.

(2). Plastic particles tend to coagulate due to static electricity, the dispersion properties are lowered, dispersion inhomogeneity are caused, and a particle concentration also becomes low.

(3). Inorganic particles projected from a surface of the coating tend to damage a light diffusing film or a prism sheet in an upper layer, and, depending on the circumstances, contact members such as a liquid crystal cell and a light guide plate.

The present invention is accomplished paying attention to such problems in the existing technology in which a light diffusing agent is mixed and dispersed. In the present invention, a light-curable liquid resin composition, that can form a layer of very fine particles of cured resin by irradiating a UV light thereon, is coated on a surface of a film substrate, followed by light-curing, and thereby an excellent light diffusing film that is excellent in the light transmission properties and light diffusing properties, and in which fine particles of cured resin that can exhibit the light diffusing function are uniformly three dimensionally dispersed can be provided.

Means for Solving the Problems

The present invention relates to a light diffusing resin film that can be formed by light-curing a light-curable liquid resin composition whose indispensable components are a photo-polymerizable monomer (A), an organic compound (B) that is incompatible with the photo-polymerizable monomer (A), a cosolvent (C) that is compatible commonly with the photo-polymerizable monomer (A) and the organic compound (B) that is incompatible with the photo-polymerizable monomer (A), and a photo-polymerization initiator (D), and a light diffusing film having the resin film at least on at least one surface of a transparent film substrate.

Furthermore, the present invention relates to a light diffusing film in which a resin film that is an aggregate of fine particles of cured resin whose average particle diameter is 0.1 to 0.9 μm formed on at least one surface of a transparent film substrate and that has a light transmittance of at least 90% and a haze of at least 85%.

Furthermore, the present invention relates to a light diffusing film that can be formed by coating, on at least one surface or both surfaces of a transparent film substrate, a light-curable liquid resin composition whose indispensable components are a photo-polymerizable monomer (A), an organic compound (B) that is incompatible with the photo-polymerizable monomer (A), a cosolvent (C) that is compatible commonly with the photo-polymerizable monomer (A) and the organic compound (B) that is incompatible with the photo-polymerizable monomer (A), and a photo-polymerization initiator (D), and by light-curing.

Still furthermore, the present invention relates to an edge lighting type backlight unit that uses the light diffusing film.

In addition, the present invention relates to a liquid crystal display device that is provided with the edge lighting type backlight unit.

BEST MODE FOR CARRYING OUT THE INVENTION

The photo-polymerizable monomer (A) used in the present invention denotes a monomer that has an unsaturated bond at a molecular end and can be radically polymerized by light. That is, the photo-polymerizable monomer (A) means a monomer that has, as an end group, an unsaturated end group such as an acryloyloxy group, a methacryloyloxy group, an acrylic amide group, a methacrylic amide group, a vinyl ether group, or a vinyl group. Among the monomers, in view of excellent photo-curability (photo-polymerizability) and physical properties of cured materials in total, the photo-polymerizable monomer that has an acryloyloxy group or a methacryloyloxy group at a molecular end, that is, an acrylate and a methacrylate (hereinafter together referred to as (meth)acrylates) are preferably used, and in particular, 2 to 6 polyfunctional (meth)acrylates are preferably used.

For example, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, hydroxypivalic neopentyl glycol ester di(meth)acrylate, dimethyloltricyclodecane di(meth)acrylate, bisphenol A-ethylene oxide (2 moles) adduct di(meth)acrylate, bisphenol F-ethylene oxide (4 moles) adduct di(meth)acrylate, trimethylol propane tri(meth)acrylate, pentaerythritol tri(meth)acrylate, dipentaerythritol hexa (meth)acrylate, ethanediol diglycidyl ether-(meth)acrylic acid (2 moles) adduct (addition reaction product of acrylic acid or methacrylic acid. The following (2 moles) adduct has the same meaning), 1,2-propanediol diglycidyl ether-(meth)acrylic acid (2 moles) adduct, 1,6-hexanediol diglycidyl ether-(meth)acrylic acid (2 moles) adduct, hydrogenated bisphenol A diglycidyl ether-(meth)acrylic acid (2 moles) adduct, bisphenol A diglycidyl ether-(meth)acrylic acid (2 moles) adduct, and trimethylol propane triglycidyl ether-(meth)acrylic acid (3 moles) adduct can be used as aliphatic, alicyclic and aromatic polyfunctional (meth)acrylates.

As the photo-polymerizable monomer (A) in the present invention, one or a combination of two or more of the polyfunctional (meth)acrylates may be used. However, in order to make the physical properties such as the mechanical strength and adherence of the light diffusing film excellent, the polyfunctional prepolymer-type (meth)acrylates can be preferably used together. The prepolymer here denotes a low molecular weight polymer that has a degree of polymerization of about 2 to 20 and is made of polyester, polyurethane, or polyether. (The polyfunctional prepolymer-type meth)acrylate denotes one that has at least two (meth)acryloyl groups or (meth)acryloyloxy groups at ends of such prepolymer).

For example, (adipic acid/1,6-hexane diol)$_n$ di(meth)acrylate (n denotes a degree of polymerization of a low molecular weight polyester obtained from adipic acid and 1,6-hexane diol, the polymer is a prepolymer, and hydroxyl groups at both ends thereof express ones that are (meth)acrylated; n is in the range of about 2 to 20, preferably in the range of about 2 to 10. Hereinafter, the same expression is used in the following) (orthophthalic acid/1,2-propanediol)$_n$ di(meth)acrylate, (2,4-tolylenediisocyanate/1,6-hexanediol)$_n$ di(meth)acrylate, (isophorone diisocyanate/diethylene glycol)$_n$ di(meth)acrylate, poly(ethylene glycol)$_n$ di(meth)acrylate, poly(1,2-propylene glycol)$_n$ di(meth)acrylate, poly(tetramethylene glycol)$_n$ di(meth)acrylate, poly(diglycidyl bisphenol A)$_n$(meth)acrylate, and (trimellitic acid/diethylene glycol)$_n$ tri(meth)acrylate can be used as polyester prepolymer-type, polyurethane prepolymer type, and polyether prepolymer-type polyfunctional (meth)acrylates.

A mixture ratio of the polyfunctional (meth)acrylate to polyfunctional prepolymer-type (meth)acrylate is in the range of from 80 to 40: from 20 to 60 (% by weight), preferably in the range of from 70 to 50: from 30 to 50 (% by weight). When the polyfunctional (meth)acrylate exceeds 80% by weight, the physical properties of the light diffusing film cannot be necessarily sufficient, and when it is less than 20% by weight, problems in the viscosity and the curability of the composition are caused.

In the present invention, in order to control the viscosity and the curability of the light-curable liquid resin composition, if necessary, a monofunctional (meth)acrylate and a monofunctional (meth)acrylate prepolymer-type (meth)acrylate can be used in combination.

For example, n-butyl (meth)acrylate, i-butyl (meth)acrylate, 2-ethyl-hexyl (meth)acrylate, cyclohexyl (meth)acrylate, isobornyl (meth)acrylate, phenyl (meth)acrylate, benzyl (meth)acrylate, phenoxyethyl (meth)acrylate, poly(ethylene glycol)$_n$ (meth)acrylate (n: afore-mentioned), methoxy poly(ethylene glycol)$_n$ (meth)acrylate, and phenoxypoly(ethyleneglycol)$_n$ (meth)acrylate can be used as aliphatic, alicyclic, aromatic and prepolymer-type monofunctional (meth)acrylates.

One or more of the monofunctional (meth)acrylates and the monofunctional prepolymer-type (meth)acrylates—are selected and mixed with a mixture of the polyfunctional (meth)acrylate and the polyfunctional prepolymer-type (meth)acrylate. A mixture ratio thereof is 30% by weight or less, preferably 20% by weight or less. When the mixture ratio exceeds 30% by weight, a cross-link density after the light-curing becomes insufficient, accordingly the light diffusing film excellent in the physical properties cannot be obtained.

The organic compound (B) that is incompatible with the photo-polymerizable monomer (A) in the present invention denotes one that is incompatible with the photo-polymerizable monomer (A) in the neighborhood of room temperature, and, when these are mixed, agitated, and left to stand, these separate into different phases. As the organic compound (B), one that has a hydrogen containing polar group such as a carboxylic group, a sulfonic group, an amide group, a primary, secondary or tertiary amino group, an alcohol group and a thiol group, and can easily cause molecular association can be used. Among these, an aliphatic compound that has a primary, secondary or tertiary amino group and an alcohol group in combination in a molecule which are remarkable in the molecular association, that is, an amino alcohol is preferable. The amino alcohols include compounds that have two or more amino groups and alcohol groups in one molecule. Among the amino alcohols, one that has a boiling point in the range of 160 to 360° C. is preferable.

For example, a lower aliphatic amino alcohol such as monoethanol amine, diethanol amine, triethanol amine, 3-amino-1-propanol, 1-amino-2-propanol, 2-amino-1-propanol, 3-amino-1,2-propane diol, 1-amino-2-butanol, 4-amino-1-butanol can be used.

When a mixture of the polyfunctional (meth)acrylate and the polyfunctional prepolymer-type (meth)acrylate that is the photo-polymerizable monomer (A) and the lower aliphatic amino alcohol class (B) in the present invention is subjected to a preliminary incompatibility test, the most preferable combination can be selected.

In the present invention, the cosolvent (C) that is compatible with both the photo-polymerizable monomer (A) and the organic compound (B) that is incompatible with the photo-polymerizable monomer (A) denotes an organic solvent that is completely compatible, when mixed, with the photo-polymerizable monomer (A) and the organic compound (B) in the neighborhood of room temperature. As such organic solvent (C), oxygen-containing solvents such as alcohols, ethers, esters, and ketones can be used.

For example, ethanol, n- and i-propanol, n- and t-butanol, n-pentanol, n-hexanol, n-octanol, n-decanol, cyclohexanol, benzyl alcohol, ethane diol, 1,2- and 1,3-propane diol, 1,4-butane diol, di-n-propyl ether, di-n-butyl ether, tetrahydrofuran, methyl phenyl ether, ethylene glycol dimethyl ether, ethylene glycol diethyl ether, diethylene glycol dimethyl ether, ethyl acetate, n-propyl acetate, cyclohexyl acetate, methyl benzoate, ethylene glycol diacetate, acetone, ethyl methyl ketone, methyl n-butyl ketone, cyclohexanone, acetophenone, ethylene glycol monomethyl ether, ethylene glycol monoethyl ether, diethylene glycol monomethyl ether, ethylene glycol monoacetate, and ethylene glycol methyl ether acetate can be used.

The above oxygen-containing solvents in the present invention can be used alone, in a combination of two or more similar solvents, or in a combination of two or more different solvents. A boiling temperature under a normal pressure of the oxygen-containing solvent alone, or the combination of the solvents is to be in the range of 50 to 250° C., preferably to be in the range of 60 to 200° C., and more preferably to be in the range of 70 to 150° C. When the boiling temperature is lower than 50° C., the solvent, being easily vaporized in the neighborhood of room temperature, is difficult not only in handling but also in controlling a mixing amount thereof in the light-curable liquid resin composition of the present invention. In contrast, when the boiling temperature exceeds 250° C., problems may be unfavorably caused in the formation of the light diffusing film of the present invention.

It is important that boiling temperatures of the amino alcohol (B) and the oxygen-containing solvent (C) used in the present invention are not close. When the boiling temperatures of both (B and C) are too close, a film of fine particles of cured resin are difficult to form. In the present invention, it is necessary that the amino alcohol has a higher boiling temperature, and the difference from that of the oxygen containing solvent is preferably to be at least 50° C., and being furthermore preferably to be at least 100° C. When the difference of the boiling temperatures is less than 50° C., an excellent light diffusing film is difficult to form according to the present invention.

In the present invention, a mixture ratio of the photo-polymerizable monomer (A), the organic compound (B) that is not compatible with the photo-polymerizable monomer (A) and the cosolvent (C) that is compatible commonly with the (A) and (B), though different depending on molecular weights and boiling temperatures of the respective components being used, is normally in the range of from 75:25 to 25:75 (% by weight) in terms of (A) to [(B)+(C)], and preferably in the range of from 70:30 to 30:70 (% by weight). When the mixture amount of the photo-polymerizable monomer (A) exceeds 75% by weight, the photo-polymerizable monomer (A) becomes too much to an amount of [(B)+(C)] component, and when it is less than 25% by weight, an amount of [(B)+(C)] component becomes too much, as a result an excellent light diffusing film is difficult to form. On the other hand, a mixture ratio of the components (B) and (C) is normally in the range of from 60:40 to 20:80 (% by weight) in terms of (B) to (C), and further preferably preferable to be in the range of from 50:50 to 30:70 (% by weight). When the (B) component exceeds 60% by weight, or is less than 20% by weight, a light diffusing film having excellent physical properties is difficult to form.

A photo-polymerization initiator (D) used in the present invention is an indispensable component for curing the photo-polymerizable liquid resin composition of the present invention by irradiating an ultra-violet light and thereby forming a light diffusing film. Of course there is no need of the photo-polymerization initiator when an electron beam irradiation is used to cure the composition. However, the electron beam irradiation method is too expensive as the curing method to be popular.

As the photo-polymerization initiator (D), there is no compound to which the present invention is restricted, and, photo-polymerization initiators generally in use, that is, all of carbonyl compound-type photo-polymerization initiators such as acetophenones, benzophenones, diacetyls, benzils, benzoins, benzoin ethers, benzil dimethyl ketals, benzoyl benzoates, hydroxy phenyl ketones, and aminophenyl ketones; organic sulfur compound-type photo-polymerization initiators such as thiuram sulfides and thioxanthones; and organic phosphorus compound-type photo-polymerization initiators such as acyl phosphine oxides can be used. In the present invention, photo-polymerization initiators can be used alone or in combinations of two or more compounds. In the present invention, the smaller addition amount of the photo-polymerization initiator (D) is the better, and it may be in the range of 0.1 to 3.0% by weight with respect to the photo-polymerizable monomer (A), preferably in the range of 0.3 to 1.5% by weight.

To the photo-polymerizable liquid resin composition of the present invention, if necessary, in the range that does not damage the light diffusing properties of the resin after the curing, additives such as an anti-static agent, a light stabilizer, a heat stabilizer, and a coloring agent can be slightly added.

When the light-curable liquid resin composition in which the photo-polymerizable monomer (A), the organic compound (B) that is incompatible with the photo-polymerizable monomer (A), the cosolvent (C) that is compatible with both the photo-polymerizable monomer (A) and the organic compound (B) that is incompatible with the photo-polymerizable monomer (A), and the photo-polymerization initiator (D) are contained as the indispensable components is coated on the film substrate and cured, a layer of cured film that has a structure in which fine particles of cured resin having particle diameters in the range of 0.1 to 0.9 μm are three dimensionally interconnected can be formed. At this time, the light-curing can be applied as coated. However, in order to obtain surface smoothness of the cured film, or in order to stabilize surface curing properties, the light-curing may be preferably applied after surface coating is covered with a releasing transparent plastic film or a glass plate. Furthermore, when concavities and convexities are given on the surface of the cured film, the light-curing process can be applied after the surface of the coating is covered with a transfer plate on which a desired fine concavoconvex pattern is formed. By forming the fine concavities and convexities on the surface of the cured film, further higher total light transmittance and a haze value can be obtained.

In order to light-cure the light-curable liquid resin composition of the present invention by irradiating a UV light thereon, a UV light emitted from an ultrahigh pressure mercury lamp, a high pressure mercury lamp, a low pressure mercury lamp, a metal halide lamp, a carbon arc lamp, or a xenon lamp that is generally used for a UV light curable resin is irradiated thereon. The high pressure mercury lamp or metal halide lamp in which a UV light at a wavelength of around 365 nm is relatively abundant is preferably used. An irradiation amount of the UV light of 600 mJ/cm$^2$ or more can cure the resin composition and an amount in the range of 1200 to 2000 mJ/cm$^2$ is preferable.

As the film substrate that can be used in the invention, though a polyethylene terephthalate film is preferable, other plastic films such as a polyethylene naphthalate film, a polyacrylate film, a polyacrylnitrile based film, a polycarbonate film, a polysulfone film, a polyethersulfone film, a polyether imide film, a polyether ketone film, a polyimide film, and a polymethylpentene film can also be used. Furthermore, if necessary, a glass substrate can be used.

The film substrate is preferable to be a transparent one or a translucent one (for instance, translucent white) Furthermore, when a film is used on one or both surfaces an which an embossing or sandblasting or matting process is applied in advance to form fine concavities and convexities, it is advantageous in that the diffusibility of a transmitting light can be further improved. A thickness of the film substrate is in general in the range of 50 to 200 μm.

Furthermore, when an antireflective layer is formed at least on one surface of the light diffusing film, since a loss due to the reflection of the light can be suppressed, it is advantageous in that the light can be improved in efficiency thereof.

As methods of coating the light-curable liquid resin composition of the present invention on a surface of a plastic film, there are a bar coat method, a knife coat method, a curtain flow coat method, a roll coat method, a dipping coat method, a spray coat method, and a spin coat method. One of these can be selected and used.

The light-curable resin composition may be coated on one surface or both surfaces of a film substrate.

An amount of coating is enough when the light transmittance and haze in a range that is required as the light diffusing film can be obtained, and a film thickness after the curing is in the range of, for instance, 10 to 100 μm, preferably in the range of 10 to 50 μm. The film thickness can be measured by use of, for instance, an ultrasonic thickness measurement method. Furthermore, in order to obtain a higher total light transmittance, the thinner film thickness is better. However, the thinner the film thickness becomes, the lower the haze results. In order to successfully achieve both higher total light transmittance and higher haze value in a thin film thickness of about 10 μm, by forming fine concavities and convexities on a surface thereof, the haze can be compensated, and thereby a higher total light transmittance and a higher haze can be successfully achieved. In the case of a cured resin layer that has a concavoconvex pattern on a surface thereof, the film thickness is expressed as a value that is measured as an average value of the maximum film thicknesses including the convexities. It can be measured by use of, for instance, a micrometer (produced by Kabushiki Kaisha MITUTOYO).

In a light diffusing resin film that is a cured resin film after the light-curing, since the organic compound (B) and the cosolvent (C) are present, these are preferably removed. In order to remove these from the cured resin film, the light diffusing resin film or light diffusing film may be immersed in a solvent such as methanol that does not so much swell the cured resin film but can dissolve and elute the organic compound (B) and the cosolvent (C), or the light diffusing resin film or light diffusing film may be put under heating and under a reduced pressure, thereby the organic compound (B) and cosolvent (C) can be removed.

Here, a parameter χ that expresses a characteristic of light scattering due to particles is expressed with $\chi=\pi \times D/\lambda$ (D: a particle diameter, λ: an wavelength of light), the light scattering due to particles depends on a particle diameter. In general, it is regarded that when χ is far larger than one, a number of one digit, and far smaller than 1, respectively, scattering characteristics of geometrical scattering, Mie scattering and Rayleigh scattering are shown. In the light diffusing resin film or light diffusing film prepared according to the present invention, since the particle diameters of the cured resin that exhibits light scattering function are in the range of 0.1 to 0.9 μm, to a visible light (wavelength: 400 to 700 nm), the parameter χ of the particle scattering becomes 2 to 4. Accordingly, the characteristic of the particle scattering belongs to a region of Mie scattering. In the Mie scattering, a light does not intrude inside of a particle and is reflected at a particle surface.

Since in the light diffusing film according to the present invention, only by irradiating with a UV light for an extremely short period of time, a layer of fine particles that can exhibit a function as a light scattering agent can be formed, it is a novel technical invention in that there is no need of mixing and dispersing the light scattering agent. Though the light diffusing film according to the invention, by utilizing characteristics thereof, can be applied to various electro-optic display devices, it can be particularly preferably applied to liquid crystal display devices.

In an electronic or an electric instrument equipped with a liquid crystal display device, since a liquid crystal display panel itself does not emit a light, a backlight unit is generally provided as a light source behind the liquid crystal display panel. In the backlight units, there are two types thereof. One type is provided with a backlight unit directly below a rear surface of the liquid crystal display panel, and the other type is provided with an edge lighting (or side lighting) type backlight unit. In the case of a liquid crystal display device of, for instance, a laptop or book type personal computer or a word processor, since lighter weight and thinner thickness are demanded, an edge lighting type backlight unit is generally used.

The edge lighting type backlight unit, as shown in FIG. 3, comprises a cold cathode tube 1, a reflective plate (or lamp reflector) 2, a light guide plate 3, a reflective plate 4, a diffusing plate (or light diffusing film) 5 and a pair of condensing plates (or prism sheet) 6. A light emitted from the cold cathode tube 1, together with a light reflected by the reflective plate 2, enters inside of the light guide plate 3. On a bottom surface of the light guide plate 3, a dot layer 7 is formed, and downward thereof the reflective plate 4 is disposed. On the top surface of the light guide plate 3, a condensing plate 6 paired with the diffusing plate 5 is overlapped. The light discharged from the top surface of the light guide plate 3 is scattered and diffused by the diffusing plate 5, there by homogenized in its brightness, furthermore focused into an angle of view by two condensing plates 6 to raise the brightness, and discharged as substantially vertical light from the top surface of the backlight unit.

In the diffusing plates used in the backlight unit, as mentioned above, there are one type in which the concavities and convexities on the surface thereof give light diffusibility and the other type in which inside of the diffusing plate or on the surface thereof a light diffusing agent such as inorganic or organic fine particles that are effective in light diffusion are mixed and dispersed or coated.

In the existing edge lighting type backlight unit, the following problems have been pointed out.

In the liquid crystal display device, an angle of visual field is demanded to be wider even only a little. However, in a liquid crystal display device provided with an existing edge lighting type backlight unit, though a light that is diffused by use of the diffusing plate is improved in a front brightness by use of the condensing plate, as the front brightness is tried to be improved more, the angle of visual field of the liquid crystal display device becomes narrower.

In order to overcome the aforementioned problems, edge lighting type backlight units having a wider angle of visual field have been studied, in particular methods in which in addition to increasing light transmittance of a film-like light diffusing plate (light diffusing film), light diffusing efficiency that is optical characteristics contrary to the light transmittance is increased have been studied. For instance, in JP-A-11-6905, in a light diffusing surface layer that is formed by coating a resin binder that contains particles of a light diffusing agent on the surface of the film substrate, fine pores are further generated in a dispersed state, and thereby excellent light transmittance and light diffusibility are tried to be successfully achieved. However, since in the method the pores are generated by vaporizing a solvent, not the pores but only through-holes of various shapes and irregular dimensions are generated in the light diffusing surface layer. Furthermore, during the vaporization of the solvent, the fine particles that are the light diffusing agent tend to agglomerate and to be localized, resulting in an inhomogeneous light diffusing layer.

The light diffusing film according to the present invention is a coating type light diffusing film that is high in the light diffusibility, excellent in the light transmittance, and does not at all contain the light diffusing agent, and enables to improve a front brightness of a surface light source device, and in particular, to enlarge an angle of visual field of a liquid crystal display device as an edge lighting type backlight unit of the liquid crystal display device.

EXAMPLES

In the following, though the present invention will be more detailed according to Examples, the present invention is not restricted to the Examples.

Characteristic values of the prepared light diffusing film and particle diameters of fine particles of the cured resin were measured according to methods explained in the following.

Total Light Transmittance and Haze

According to methods described in JIS K7361 (total light transmittance) and JIS K7136 (haze), the total light transmittance and the haze were measured by use of a haze meter (a product of Nippon Denshoku K. K, model No.: NDH2000).

Crosscut Adhesion Test

According to a method described in JIS K5400, brittleness of the light diffusing resin layer formed with the fine particles of cured resin and adhesion thereof to the film substrate were measured and evaluated by grade points.

Particle Diameter of Fine Particles of Cured Resin

An electron micrograph microgram was taken with a transmission electron microscope (a product of Hitachi, Ltd, model No.: H-600), and an average particle diameter of 100 fine particles was measured. An accelerating voltage was set at 100 kV.

Observation of Surface Morphology

By use of an ultra high resolution field emission scanning electron microscope (a product of Hitachi, Ltd, model No.: S-900H), surface morphology of the layer of fine particles of the cured resin was observed.

An accelerating voltage was set at 5 kV. On a surface of the layer of the fine particles of cured resin, Pt (platinum) was sputtered to coat, and the surface was observed according to a direct method.

Angle of Visual Field

By use of a goniometer type photometer (a product of Murakami Shikisai Kenkyusho, model No.: GP-200), light was entered with an angle of incidence of zero degree on the back surface of the light diffusing film (the film surface that does not have the light diffusing resin layer), a relative distribution of the light transmitted through the surface (the film surface that has the light diffusing resin surface layer) was measured over a range of zero degree to +90 degree, and thereby an angle of visual field was judged.

Example 1

As photo polymerizable monomers (A), trimethylol propane triacrylate (manufactured by Kyoueisha Chemical Co. Ltd, trade name: Light Acrylate TMP-A) 40 parts by weight and polytetramethylene glycol (degree of polymerization of about 3) diacrylate (manufactured by Kyoueisha Chemical Co. Ltd, trade name: Light Acrylate PTMGA-250) 20 parts by weight were blended. Thereto, as a photo-polymerization initiator (D), 2-hydroxy-2-methyl-1-phenyl-propane-1-on (produced by Ciba Specialty Chemicals Inc, trade name: Darocure 1173) 0.5 parts by weight was blended and followed by thorough mixing. Subsequently, as an organic compound (B) that is incompatible with the photo-polymerizable monomer (A), triethanol amine 20 parts by weight, and as a the cosolvent (C) that is commonly compatible with the photo-polymerizable monomers (A) and the organic compound (B) that is incompatible with the photo-polymerizable monomers (A), isopropanol 40 parts by weight were blended and followed by thorough mixing until transparency was obtained, and thereby a homogeneous light-curable liquid resin composition (1) was prepared.

The obtained light-curable liquid resin composition (1) was coated on an A-4 size polyethylene terephthalate film having a thickness of 100 µm (manufactured by Teijin Limited, trade name: HS type) by use of a bar coater coating machine so that a film thickness may be 50 µm, followed by covering it with a releasing polyethylene terephthalate film having a film thickness of 100 µm, and further followed by immediately irradiating with a UV light from a high pressure mercury lamp up to about 1200 mJ/cm$^2$, and thereby the light-curable liquid resin composition (1) was light-cured.

Subsequently, the mold releasing film was peeled off, the light-cured resin layer was washed with methanol to remove triethanol amine and isopropanol and followed by air drying, and thereby a light diffusing film (I) having a light diffusing resin surface layer having a film thickness of 40 µm after the air drying was obtained.

The cured resin surface layer of the obtained light diffusing film (I) was observed by use of a transmission electron microscope to measure particle diameters of fine particles of the cured resin. An average particle diameter thereof was about 0.5 µm.

A result of the crosscut adhesion test of the cured resin surface layer was grade 10.

Subsequently, optical characteristics of the light diffusing film (I) were measured, and excellent values of the total light transmittance of 91.2% and of the haze of 88.5% were obtained.

Electron micrographs of the cured resin surface layer obtained are shown in FIG. 1 (10,000 timesmultiplied) and FIG. 2 (40,000 times multiplied).

Comparative Example 1

Three components excluding isopropanol (C) among four components in Example 1, that is, trimethylol propane triacrylate (aforementioned), polytetramethylene glycol diacrylate (aforementioned) (both for component A), Darocure 1173 (aforementioned) (D) and triethanol amine (B) were blended with the same weight parts as in Example 1 and followed by thorough mixing. However, soon after leaving to stand, a phase separation occurred, resulting in incapability of obtaining a homogeneous solution.

Comparative Example 2

Three components excluding triethanol amine (B) among four components in Example 1, that is, trimethylolpropane triacrylate (aforementioned), polytetramethylene glycol diacrylate (aforementioned) (both for component A), Darocure 1173 (aforementioned) (D) and isopropanol (C) were blended with the same weight parts as in Example and followed by thorough mixing, and thereby a light-curable liquid resin composition (a) was prepared.

An attempt was made to light-cure the resin composition (a) according to the same procedure as that of Example 1. However, only a transparent and colorless soft light-cured resin layer was generated, that is, a surface layer formed of fine particles of the cured resin was not at all obtained.

Example 2

Out of the photo-polymerizable monomers (A) in Example 1, polytetramethylene glycol diacrylate (aforementioned) was not used, but instead, 60 parts by weight of trimethylolpropane triacrylate (aforementioned) was used. The trimethylolpropane triacrylate 60 parts by weight and the other components same as in Example 1 in the same parts by weight as in Example 1 were blended and followed by thorough mixing, and thereby a transparent homogeneous light curable liquid resin composition (2) was prepared. With the obtained light curable liquid resin composition (2), according to the same procedure as that of Example 1, a light diffusing film (II) was obtained.

Particle diameters of fine particles of the cured resin of the surface layer of the obtained light diffusing film (II) were measured similarly to Example 1 and were found to have an average particle diameter of 0.5 μm. A result of the crosscut adhesion test of the surface layer of the cured resin was grade 2.

Subsequently, optical characteristics of the light diffusing film (II) were measured similarly to Example 1, and excellent values of the total light transmittance of 91.0% and the haze of 87.9% were obtained.

Example 3

As photo-polymerizable monomers (A), trimethylolpropane trimethacrylate (manufactured by Kyoueisha Chemical Co. Ltd, trade name: Light Ester TMP) 35 parts by weight, polyethylene glycol (degree of polymerization of 2) diglicidyl ether-methacrylic acid (2 moles) adduct (manufactured by Kyoueisha Chemical Co. Ltd, trade name: Epoxyester 40EM) 15 parts by weight and as a reactive diluent, isobornyl methacrylate (manufactured by Kyoueisha Chemical Co. Ltd, trade name: Light Ester IB-X) 10 parts by weight were blended. Thereto, as a photo-polymerization initiator (D), 1-hydroxy-2-cyclohexyl phenyl ketone (manufactured by Ciba Specialty Chemicals Inc, trade name: Irgacure 184) 0.5 parts by weight was blended and followed by thorough mixing. Subsequently, as an organic compound (B), diethanol amine 20 parts by weight, and furthermore, as a cosolvent (C), ethylene glycol monomethyl ether 40 parts by weight were blended and followed by thorough mixing until transparency was obtained, and thereby a homogeneous light-curable liquid resin composition (3) was prepared.

The obtained light-curable liquid resin composition (3) was coated on an A-4 size polyethylene terephthalate film having a thickness of 100 μm (aforementioned) that was placed on a glass plate having a thickness of 1.0 mm and having spacers having a thickness of 40 μm placed along four sides by use of a bar coater coating machine and followed by placing thereon a glass plate having a thickness of 1.0 mm to cover the coated film, and under this state, UV light from a high pressure mercury lamp was irradiated up to about 1500 mJ/cm$^2$.

Subsequently, the polyethylene terephthalate film having a light-cured resin surface layer was taken out from between two glass plates, the surface layer of the light-cured resin layer was washed with methanol to remove diethanol amine and ethylene glycol monomethyl ether and followed by air drying, and thereby a light diffusing film (III) having a light diffusing resin surface layer was obtained.

Particle diameters of fine particles of the cured resin on a surface layer of the obtained light diffusing film (III) were measured similarly to Example 1. An average particle diameter thereof was found to be about 0.5 μm. Furthermore, a result of the crosscut adhesion test thereof was found to be grade 10.

Subsequently, optical characteristics of the light diffusing film (III) were measured similarly to Example 1, and excellent values of the total light transmittance of 93% and of the haze of 86.7% were obtained.

Comparative Example 3

Three components excluding ethylene glycol monomethyl ether (C) among four components in Example 3, that is, trimethylolpropane trimethacrylate (aforementioned), polyethylene glycol (degree of polymerization is 2) diglycidyl ether-methacrylic acid (2 moles) adduct (aforementioned), isobornyl methacrylate (aforementioned) (these are the component A), Irgacure 184 (aforementioned) (D) and diethanol amine (B) were blended with the same weight parts as Example 3 and followed by thorough mixing. However, soon after leaving to stand, a phase separation occurred and a homogeneous solution could not be obtained.

Comparative Example 4

Three components excluding diethanol amine (B) among four components in Example 3, that is, trimethylolpropane trimethacrylate (aforementioned), polyethylene glycol (degree of polymerization is 2) diglycidyl ether-methacrylic acid (2 moles) adduct (aforementioned), isobornyl methacrylate (aforementioned) (these are the component A), Irgacure 184 (aforementioned) (D) and ethylene glycol monomethyl ether (C) were blended with the same weight parts as Example 3 and followed by thorough mixing, and thereby a light-curable liquid resin composition (b) was prepared.

The resin composition (b) was subjected to the light-curing process according to the same procedure as Example 3. However, only a soft transparent and colorless light-cured resin layer was obtained, that is, a surface layer made of fine particles of a cured resin could not be formed.

Example 4

As photo-polymerizable monomers (A), hydroxypivalic neopentyl glycol ester diacrylate (manufactured by Nihon Kayaku KK, trade name: KAYARAD MANDA) 30 parts by weight and urethane prepolymer containing acryloyl groups at both ends (manufactured by Kyoueisha Chemical Co., Ltd., trade name: UF-503LN, component: polyalkylene glycol/aliphatic isocyanate, degree of polymerization=about 4, dissolved in ethyl methyl ketone (30% by weight)) 25 parts by weight were blended, thereto as the photo-polymerization initiators (D), a mixture of bis (2,6-dimethoxybenzoil)-2,4,4-trimethylpentyl phosphine oxide and Darocure 1173 (aforementioned) (mixing ratio=1:3) (manufactured by Ciba Specialty Chemicals Inc., trade name: Irgacure 1700) 1 part by weight was blended and followed by thorough mixing.

Subsequently, as an organic compound (B), 3-amino-1-propanol 20 parts by weight, furthermore as a cosolvent (C), ethylmethylketone 25 parts by weight were blended thereto and followed by thorough agitation, and thereby a homogeneous light curable liquid resin composition (4) was prepared.

The obtained light-curable liquid resin composition (4) was coated on an A-4 size polyethylene terephthalate film having a thickness of 75 µm (aforementioned) by use of a bar coater coating machine so that a film thickness may be 50 µm, followed by covering it with a mold releasing polyethylene terephthalate film having a film thickness of 100 µm and further immediately followed by irradiating with a UV light from a high pressure mercury lamp up to about 1500 mJ/cm$^2$.

Subsequently, after the releasing film was peeled off, in a vacuum dryer kept at 50° C., 3-amino-1-propanol and ethyl methyl ketone were vaporized from the surface layer and removed therefrom, and thereby a light diffusing film (IV) that had a light diffusing resin surface layer having a thickness of 40 µm after the drying was obtained.

Particle diameters of fine particles of the cured resin in the obtained light diffusing film (IV) surface layer were measured similarly to Example 1 and an average particle diameter was found to be about 0.5 µm. Furthermore, a result of the crosscut adhesion test was grade 10.

Subsequently, optical characteristics of the light diffusing film (IV) were measured similarly to Example 1, and excellent values of the total light transmittance of 92.0% and of the haze of 87.2% were obtained. Still furthermore, when an angle of visual field of the light diffusing film (IV) was measured, results shown in FIG. 4 were obtained, that is, it was found that even at ±45 degrees a high relative distribution was shown.

Comparative Example 5

Three components excluding 3-amino-1-propanol (B) among four components in Example 4, that is, hydroxypivalic neopentyl glycol ester diacrylate (aforementioned), urethane prepolymer containing acryloyl groups at both ends (UF-503LN) (aforementioned) (these are the component A), Irgacure 1700 (aforementioned) (D) and ethyl methyl ketone (C) were blended, and tehreto the light-curing process was applied similarly to Example 4. However, only a soft gel-like light-cured resin surface layer was obtained. When the resin surface layer was dried in a vacuum drier similarly to Example 4 to vaporize and remove therefrom ethyl methyl ketone, cracks of various sizes were caused on the surface layer, that is, a surface layer made of fine particles of the cured resin could not be formed.

Example 5

A manufacturing method according to an example is explained with reference to FIG. 5A to 5D in the following. A light-curable liquid resin composition 11 according to Example 1 was poured on a polyethylene terephthalate film substrate 10 (FIG. 5A). On the liquid drop thereof, a transfer plate 12 on which fine concavoconvex shape was patterned was is placed (FIG. 5B), and thereby, between the film substrate 10 and the transfer plate 12, the liquid film of the light-curable liquid resin composition 11 was formed so that a film thickness after the curing would be about 10 µm. The thickness of the liquid film was controlled by adjusting a pressure applied on the transfer plate.

Subsequently, while precisely transferring the concavoconvex pattern on the resin composition 11 by use of the transfer plate on which the fine pattern of concavities and convexities were are patterned, UV light was irradiated up to about 1200 mJ/cm$^2$, and thereby the resin composition 11 was cured (FIG. 5C).

Subsequently, the transfer plate was removed upward, the cured resin layer was washed with ethanol to remove triethanol amine and isopropanol remaining in the resin layer and followed by air drying, and thereby a light diffusing film (V) (FIG. 5D) having a light diffusing resin surface layer on which the fine concavoconvex pattern was transferred was obtained.

When the optical characteristics of the obtained light diffusing film (V) were measured, excellent values of the total light transmittance of 99.2% and the haze value of 89.5% were obtained.

When these were compared with the results of Example 1, both the total light transmittance and the haze value were improved. Accordingly, when the fine concavities and convexities of the surface shape were used in combination, an excellent light diffusing film could be manufactured.

The transfer plate was prepared according to a photolithography method in which a pattern of fine concavities and convexities was formed by irradiating a UV light with a mask and followed by depositing gold by means of gold sputtering, and could be formed into an arbitrary shape and size. Other than this, a fine processing with a laser or EB (electron beam) lithography could also be applied. When surface roughness of the prepared transfer plate was measured with a surface roughness meter, it was found that the transfer plate had the concavities and convexities of about 2 to 3 µm. (Effects that are more effective than the existing technology)

The light diffusing film obtained according to the present invention has the following advantages over the existing technology.

(1) Since the particle diameters and the state of dispersion are uniform, the total light transmittance and the haze satisfy the required characteristic values, resulting in exhibiting the excellent light diffusibility.

(2) The problems of coagulation, non-uniformity in dispersion and so on of particles of the light diffusing agent are not at all caused.

(3) Owing to the light-curing with UV light, only a very short time is required in preparation.

(4) Since the light-curable liquid resin composition is in a liquid state before the curing, the light diffusing film can be formed into complicated shapes, accordingly this technology has a very wide range of applications in electro-optic components and optical components.

(5) When the light diffusing film is applied to the backlight unit of the liquid crystal display device, not only the brightness can be improved but also the angle of visual field thereof can be expanded.

Figure 1:
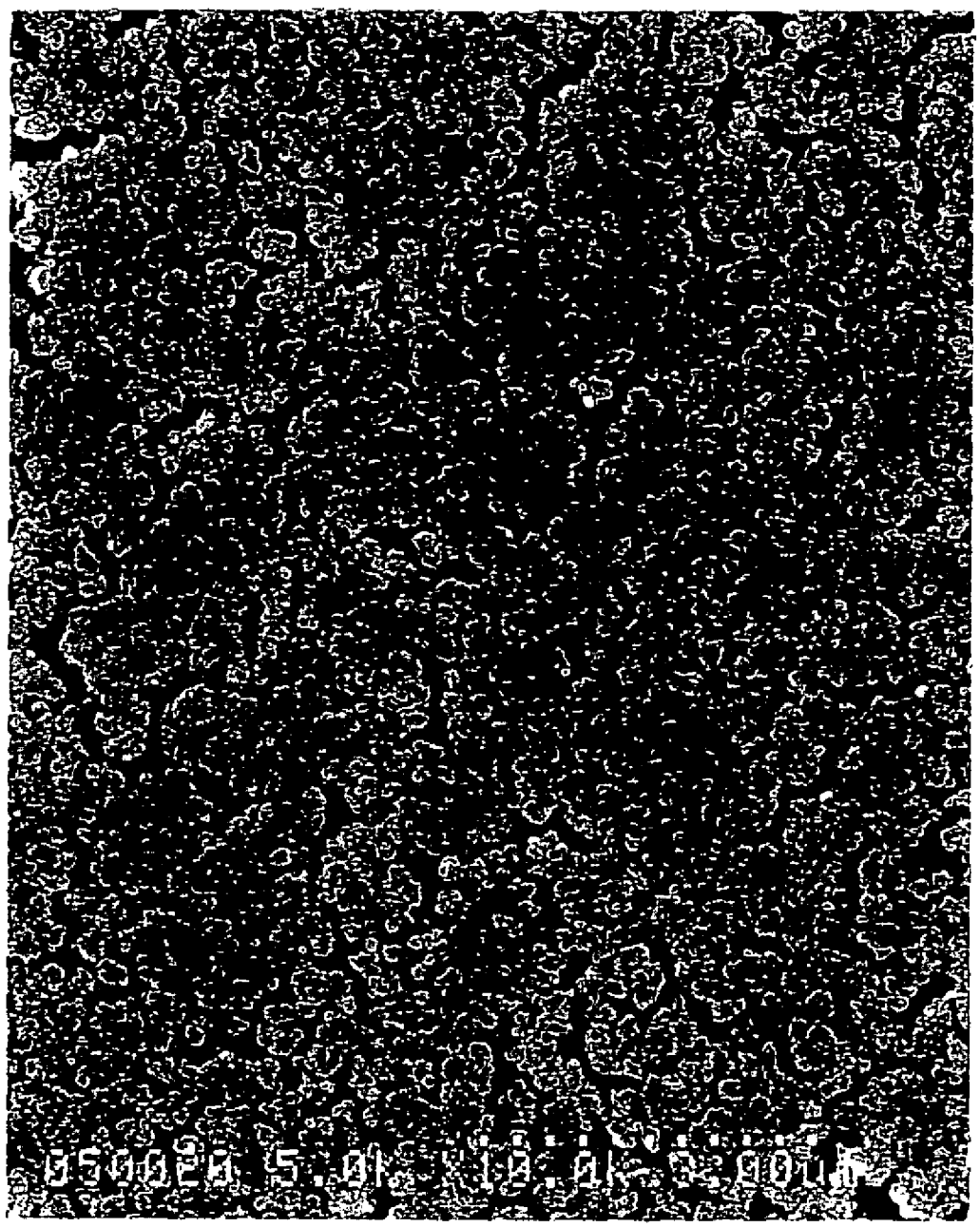
FIG. 1 is an electron micrograph (multiplied by 10,000 times) showing a particle structure of a light diffusing resin surface layer obtained according to Example 1.
Figure 2:
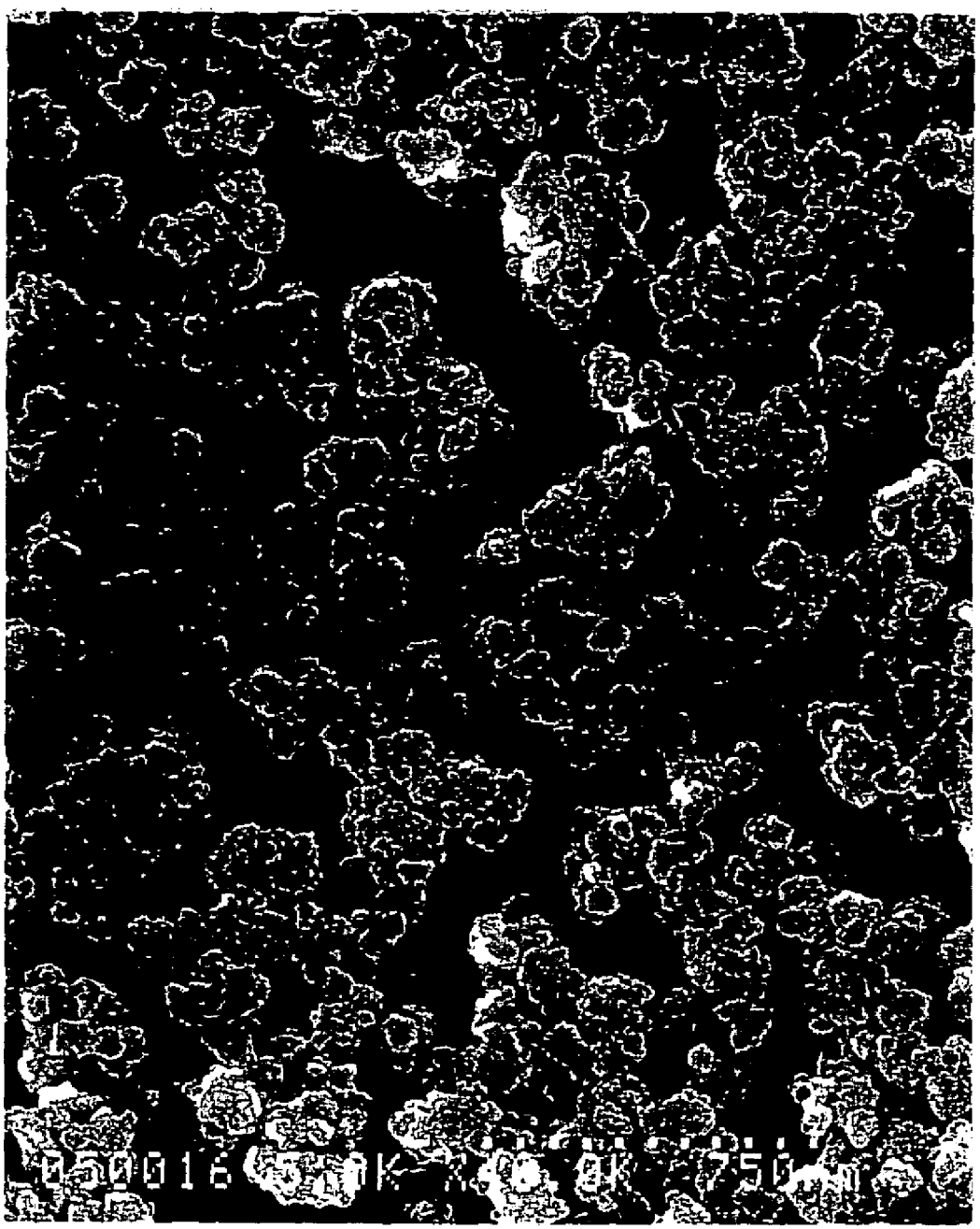
FIG. 2 is an electron micrograph (multiplied by 40,000 times) showing a particle structure of a light diffusing resin surface layer obtained according to Example 1.
Figure 3:
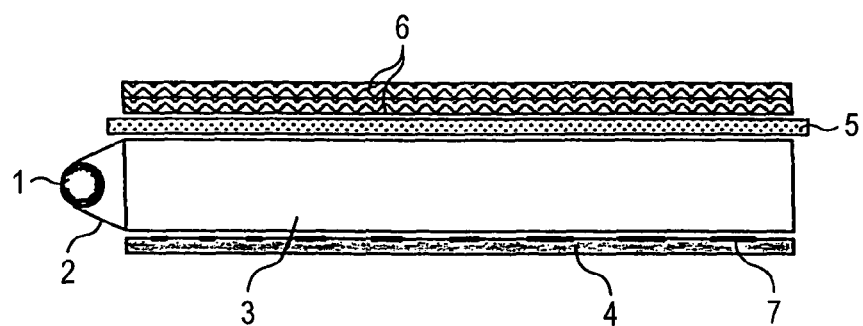
FIG. 3 is a schematic sectional view of an edge lighting type backlight unit.
Figure 4:
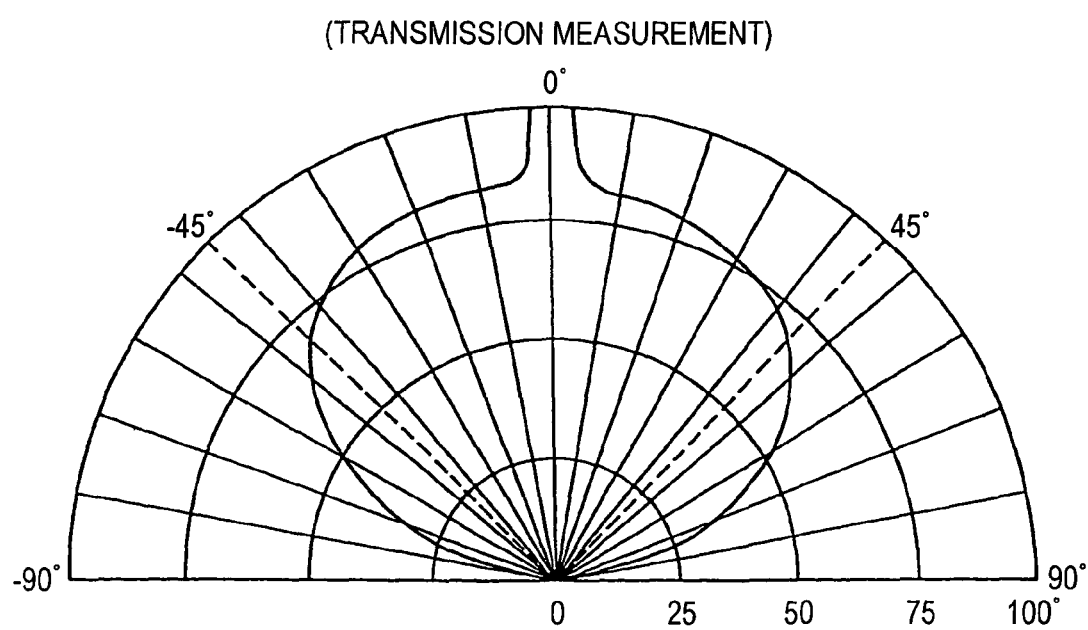
FIG. 4 is a diagram showing a relative distribution of a light transmitted through a light diffusing film obtained according to Example 4.
Figure 5A:
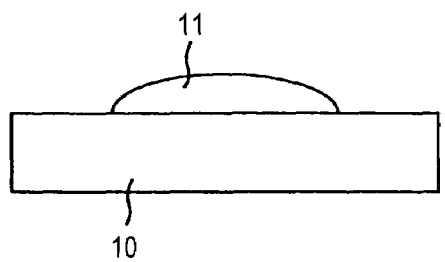
FIG. 5A to 5D are diagrams for explaining an example of manufacturing method of a light diffusing film having a light diffusing resin layer having a fine concavoconvex pattern on a surface, which are described in Example 5.
Figure 5B:
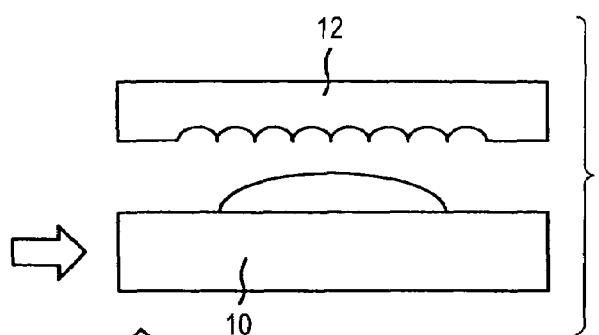
Figure 5C:
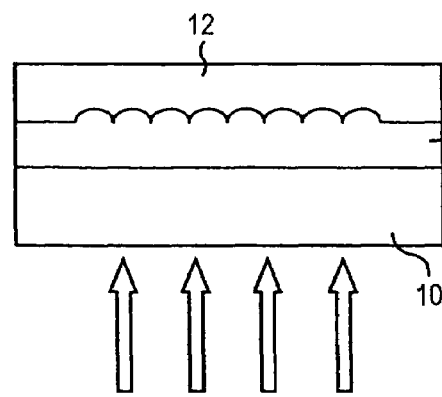
Figure 5D:
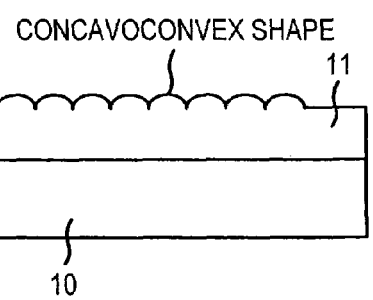

The invention claimed is:

1. A light diffusing resin film:
wherein the light diffusing resin film is formed by light-curing a light-curable liquid resin composition whose indispensable components are a photo-polymerizable monomer (A), an aliphatic amino alcohol (B) that is incompatible with the photo-polymerizable monomer (A), a cosolvent (C) that is compatible commonly with the photo-polymerizable monomer (A) and the aliphatic amino alcohol (B) that is incompatible with the photo-polymerizable monomer (A), and a photo-polymerization initiator (D);
wherein all indispensable components are present during the light-curing;
wherein the cured light diffusing resin film is substantially transparent;
wherein the aliphatic amino alcohol (B) comprises at least 15 wt % of a combined amount of the indispensable components;
wherein the photo-polymerization initiator (D) is selected from group consisting of carbonyl compound based photo-polymerization initiators, organic sulfur compound based photo-polymerization initiators, and organic phosphorus compounds based photo-polymerization initiators in amount ranging from 0.1 to 3.0% by weight with respect to the photo-polymerizable monomer (A); and
wherein the light diffusing resin film is an aggregate of fine particles of cured resin having an average particle diameter in the range of 0.1 to 0.9 μm.

2. A light diffusing resin film as set forth in claim 1:
wherein the photo-polymerizable monomer (A) is a mixture of at least one selected from polyfunctional acrylates and methacrylates, and at least one selected from polyfunctional prepolymer type acrylates and methacrylates.

3. A light diffusing resin film as set forth in claim 1:
wherein the cosolvent (C) is at least one selected from the group consisting of alcohols, ethers, esters, and ketones.

4. A light diffusing resin film as set forth in claim 3:
wherein a boiling temperature of the amino alcohol is in the range of 160 to 360° C. and that of the cosolvent (C) is in the range of 50 to 250° C.

5. A light diffusing resin film as set forth in claim 1:
wherein a surface of the light diffusing resin film is formed into a concavo-convex shape.

6. A light diffusing film:
wherein the light diffusing film is formed by forming the light diffusing resin film as set forth in claim 1 on a surface layer of a transparent film substrate and has light transmittance of 90% or more and haze of 85% or more.

7. A light diffusing film as set forth in claim 6:
wherein the aliphatic amino alcohol (B) and the cosolvent (C) are removed from the light diffusing resin film.

8. A light diffusing film:
wherein the light diffusing film is formed by coating a light-curable liquid resin composition whose indispensable components are a photo-polymerizable monomer (A), aliphatic amino alcohol (B) that is incompatible with the photo-polymerizable monomer (A), a cosolvent (C) that is compatible commonly with the photo-polymerizable monomer (A) and the aliphatic amino alcohol (B) that is incompatible with the photo-polymerizable monomer (A), and a photo-polymerization initiator (D) on one or both surfaces of a film substrate followed by curing;
wherein all indispensable components are present during the light-curing;
wherein the cured light diffusing film is substantially transparent;
wherein the aliphatic amino alcohol (B) comprises at least 15 wt % of a combined amount of the indispensable components;
wherein the photo-polymerization initiator (D) is selected from group consisting of carbonyl compound based photo-polymerization initiators, organic sulfur compound based photo-polymerization initiators, and organic phosphorus compounds based photo-polymerization initiators in amount ranging from 0.1 to 3.0% by weight with respect to the photo-polmerizable monomer (A); and
wherein the light diffusing resin film is an aggregate of fine particles of cured resin having an average particle diameter in the range of 0.1 to 0.9 μm.

9. A light diffusing film as set forth in claim 8:
wherein the light-curable liquid resin composition is light-cured so as to have a concavo-convex surface shape after the curing.

10. A light diffusing film as set forth in claim 8:
wherein the photo-polymerizable monomer (A) is a mixture of at least one selected from polyfunctional acrylates and methacrylates, and at least one selected from polyfunctional prepolymer type acrylates and methacrylates.

11. A light diffusing film as set forth in claim 8:
wherein the cosolvent (C) is at least one selected from the group consisting of alcohols, ethers, esters, and ketones.

12. A light diffusing film as set forth in claim 11:
wherein a boiling temperature of the amino alcohol is in the range of 160 to 360° C. and that of the cosolvent (C) is in the range of 50 to 250° C.

13. A light diffusing film as set forth in claim 8:
wherein at least one surface of the film substrate is subjected to at least one of embossing, sand blasting, and a matting process.

14. An edge lighting type backlight unit:
wherein the light diffusing film set forth in claim 5 is used.

15. A liquid crystal display device:
wherein the liquid crystal display device is provided with the edge lighting type backlight unit set forth in claim 14.

16. An edge lighting type backlight unit:
wherein the light diffusing film set forth in claim 6 is used.

17. An edge lighting type backlight unit:
wherein the light diffusing film set forth in claim 7 is used.

18. An edge lighting type backlight unit:
wherein the light diffusing film set forth in claim 8 is used.

19. An edge lighting type backlight unit:
wherein the light diffusing film set forth in claim 9 is used.

20. An edge lighting type backlight unit:
wherein the light diffusing film set forth in claim 10 is used.

21. An edge lighting type backlight unit:
wherein the light diffusing film set forth in claim 11 is used.

22. An edge lighting type backlight unit:
wherein the light diffusing film set forth in claim 12 is used.

23. An edge lighting type backlight unit:
wherein the light diffusing film set forth in claim 13 is used.

24. A light diffusing film as set forth in claim 1, wherein the aliphatic amino alcohol (B) is selected from group consisting of a monoethanol amine, a diethanol amine, a 3-amino-1-propanol, a 1-amino-2-propanol, and a 2-amino-lpropananol.

25. A light diffusing film as set forth in claim 8, wherein the aliphatic amino alcohol (B) is selected firom group consisting of a monoethanol amine, a diethanol amine, a 3-amino-1-propanol, a 1-amino-2-propanol, and a 2-amino-lpropananol.

* * * * *